United States Patent
Lee et al.

(10) Patent No.: US 10,795,554 B2
(45) Date of Patent: Oct. 6, 2020

(54) METHOD OF OPERATING TERMINAL FOR INSTANT MESSAGING SERVICE

(71) Applicant: KAKAO CORP., Jeju-si, Jeju-do (KR)

(72) Inventors: Hwa Young Lee, Seoul (KR); Ki Yong Shim, Seoul (KR); Sun Ho Choi, Seongnam-si (KR); Doo Won Lee, Gwangju-si (KR); Eun Jung Ko, Seoul (KR); Cho Eun Kim, Seoul (KR); Pyung Hwa Choi, Yongin-si (KR); Ji Sun Lee, Yongin-si (KR); Seung Yeon Jung, Seongnam-si (KR); Jae Gil Lee, Incheon (KR)

(73) Assignee: KAKAO CORP., Jeju-si, Jeju-Do (KR)

(*) Notice: Subject to any disclaimer, the term of this patent is extended or adjusted under 35 U.S.C. 154(b) by 0 days.

(21) Appl. No.: 16/503,467

(22) Filed: Jul. 4, 2019

(65) Prior Publication Data
US 2020/0012398 A1    Jan. 9, 2020

(30) Foreign Application Priority Data

Jul. 6, 2018 (KR) .................. 10-2018-0078943

(51) Int. Cl.
| | |
|---|---|
| *G06F 3/0484* | (2013.01) |
| *H04W 4/12* | (2009.01) |
| *G06F 3/0488* | (2013.01) |
| *G06F 3/16* | (2006.01) |

(52) U.S. Cl.
CPC .......... *G06F 3/0484* (2013.01); *G06F 3/0488* (2013.01); *G06F 3/167* (2013.01); *H04W 4/12* (2013.01)

(58) Field of Classification Search
CPC .......... H04W 4/08; H04W 4/12; H04W 4/06; H04W 12/06; H04W 12/08; H04W 4/029; H04W 4/90; H04W 68/00; H04L 51/26; H04L 51/18; H04L 51/10; H04L 51/36; G06F 3/0484; G06F 9/542

See application file for complete search history.

(56) References Cited

U.S. PATENT DOCUMENTS

| | | | | |
|---|---|---|---|---|
| 2014/0357226 | A1* | 12/2014 | Charugundla | H04W 4/023 455/411 |
| 2014/0362165 | A1* | 12/2014 | Ackerman | H04L 65/4076 348/14.07 |

FOREIGN PATENT DOCUMENTS

| | | |
|---|---|---|
| KR | 1020130055767 A | 5/2013 |
| KR | 1020130086851 A | 8/2013 |
| KR | 1020140042660 A | 4/2014 |
| KR | 1020180017227 A | 2/2018 |

* cited by examiner

*Primary Examiner* — Maryam M Ipakchi
(74) *Attorney, Agent, or Firm* — Cantor Colburn LLP

(57) ABSTRACT

Disclosed is a method of operating a terminal on which an application for an instant messaging service is installed, the method that displays a first user interface (UI) for switching an input mode in a chatting interface of a chatroom in which a user of the application is participating, based on whether the user is assigned an authority to emphasize a message in the chatroom, switches the input mode from a first mode which is a normal mode to a second mode for emphasizing a message, in response to a user input with respect to the first UI, emphasizes a message input in the second mode for a predetermined period in a predetermined manner, and cancels the emphasizing of the message input in the second mode, when the predetermined time elapses.

19 Claims, 13 Drawing Sheets

METHOD OF OPERATING TERMINAL FOR INSTANT MESSAGING SERVICE

CROSS-REFERENCE TO RELATED APPLICATION(S)

This application claims the benefit of Korean Patent Application No. 10-2018-0078943, filed on Jul. 6, 2018, in the Korean Intellectual Property Office, the disclosure of which is incorporated herein by reference.

BACKGROUND

1. Field of the Invention

One or more example embodiments relate to a method of operating a terminal for an instant messaging service.

2. Description of the Related Art

Recently, there has been an active use of a group chat in which participants closely communicate with each other through an instant messaging service, strangers play a game together at an enthusiastic suggestion from a specific person, or participants have a conversation about a specific topic, or exchange contents. An announcement function may be used to transmit information or chatroom rules in a group chatroom. However, the announcement function has a difficulty in conveying contents to be conveyed by a specific person in real time through a chatroom, or emphasizing a message sent by a specific person.

SUMMARY

According to an aspect, there is provided a method of operating a terminal on which an application for an instant messaging service is installed, the method including displaying, by the terminal, a first user interface (UI) for switching an input mode in a chatting interface of a chatroom in which a user of the application is participating, based on whether the user is assigned an authority to emphasize a message in the chatroom, switching, by the terminal, the input mode from a first mode which is a normal mode to a second mode for emphasizing a message, in response to a user input with respect to the first UI, emphasizing, by the terminal, a message input in the second mode for a predetermined period in a predetermined manner, and cancelling, by the terminal, the emphasizing of the message input in the second mode, when the predetermined time elapses, wherein a second UI for inputting a feedback responding to the message input in the second mode by the user assigned the authority may be displayed in a second chatting interface of at least one user not assigned the authority, among users participating in the chatroom, for the predetermined period during which the message input in the second mode is emphasized, and the displaying of the second UI may be cancelled together in the second chatting interface of the at least one user, in response to the cancelling of the emphasizing of the message input in the second mode when the predetermined time elapses.

The emphasizing may include displaying the message input in the second mode for a predetermined period in a predetermined region different from a message region of the chatting interface.

The emphasizing may include displaying the message input in the second mode together with at least one of identification information of the user set for the chatroom and a profile photo of the user set for the chatroom.

The predetermined region may overlay an announcement region.

The method may further include displaying, by the terminal, the message input in the second mode as a chatting message in a message region of the chatting interface.

The message may include at least one of text information, audio information, and image information, wherein the emphasizing may include at least one of automatically playing back the audio information for the predetermined period, when the message corresponds to the audio information, and displaying a thumbnail image of the image information for the predetermined period, when the message corresponds to the image information.

The method may further include displaying, by the terminal, the second UI for inputting a feedback responding to the message input in the second mode, in the chatting interface for the predetermined period during which the message input in the second mode is emphasized, and cancelling, by the terminal, the displaying of the second UI together in the chatting interface, in response to the cancelling of the emphasizing of the message input in the second mode when the predetermined time elapses.

The terminal on which the application is installed may include a touch-sensitive display, wherein the switching may include detecting the user input by a first touch at a location on the touch-sensitive display corresponding to a location of the first UI in the chatting interface, and switching the input mode from the first mode to the second mode, in response to a detection of the user input by the first touch.

The method may further include displaying, by the terminal, a message set including a plurality of messages provided in advance for the second mode, in the chatting interface when the input mode is switched to the second mode, and receiving, by the terminal, a user input of selecting one of the messages included in the message set.

The method may further include detecting, by the terminal, a user input by a second touch at a location on a touch-sensitive display of the terminal corresponding to a region of the emphasized message in the chatting interface, and cancelling, by the terminal, the emphasizing of the message input in the second mode before the predetermined period elapses, in response to a detection of the user input by the second touch.

The emphasizing may include, when a second message input in the second mode by the user or another user having the authority is received while a first message input in the second mode is emphasized, cancelling, by the terminal, emphasizing of the first message before the predetermined period elapses, and emphasizing, by the terminal, the second message for the predetermined period in the predetermined manner.

The method may further include receiving, by the terminal, a user input with respect to the second UI, and representing, by the terminal, the feedback using the chatting interface, in response to the user input.

The displaying of the second UI in the chatting interface may include displaying the second UI for the predetermined period at a predetermined location in the chatting interface, when the second UI is coupled to the message input in the second mode.

The predetermined location may include at least one of a location fixed irrespective of a sequential flow of chatting messages in a message region of the chatting interface, and a location belonging to a chatting message corresponding to the message input in the second mode, among the chatting messages.

The displaying of the second UI in the chatting interface may include continuously displaying the second UI at a predetermined location in the chatting interface, when the second UI is not coupled to the message input in the second mode.

The method may further include adjusting, by the terminal, the predetermined period based on the user input with respect to the second UI.

The representing may include applying an animation effect corresponding to the feedback to a background of a message region in the chatting interface, based on the user input with respect to the second UI.

The authority may include a first authority assigned to a representative of the chatroom, and a second authority assigned to at least one participant selected by a possessor of the first authority.

The chatroom may include a group open chatroom in which anonymous users participate.

According to another aspect, there is provided a method of operating a terminal for an instant messaging service, the method including displaying, by the terminal, a first UI in a chatting interface of a chatroom in which a user of an application is participating, based on whether the user is assigned an authority to emphasize a message in the chatroom, receiving, by the terminal, a message input into an input region of the chatting interface, transmitting, by the terminal, the input message, in response to a user input with respect to the first UI, emphasizing, by the terminal, the message transmitted through the first UI for a predetermined period in a predetermined manner, and cancelling, by the terminal, the emphasizing of the message transmitted through the first UI, when the predetermined time elapses, wherein a second UI for inputting a feedback responding to the message transmitted through the first UI by the user assigned the authority may be displayed in a second chatting interface of at least one user not assigned the authority, among users participating in the chatroom, for the predetermined period during which the message transmitted through the first UI is emphasized, and the displaying of the second UI may be cancelled together in the second chatting interface of the at least one user, in response to the cancelling of the emphasizing of the message transmitted through the first UI when the predetermined time elapses.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
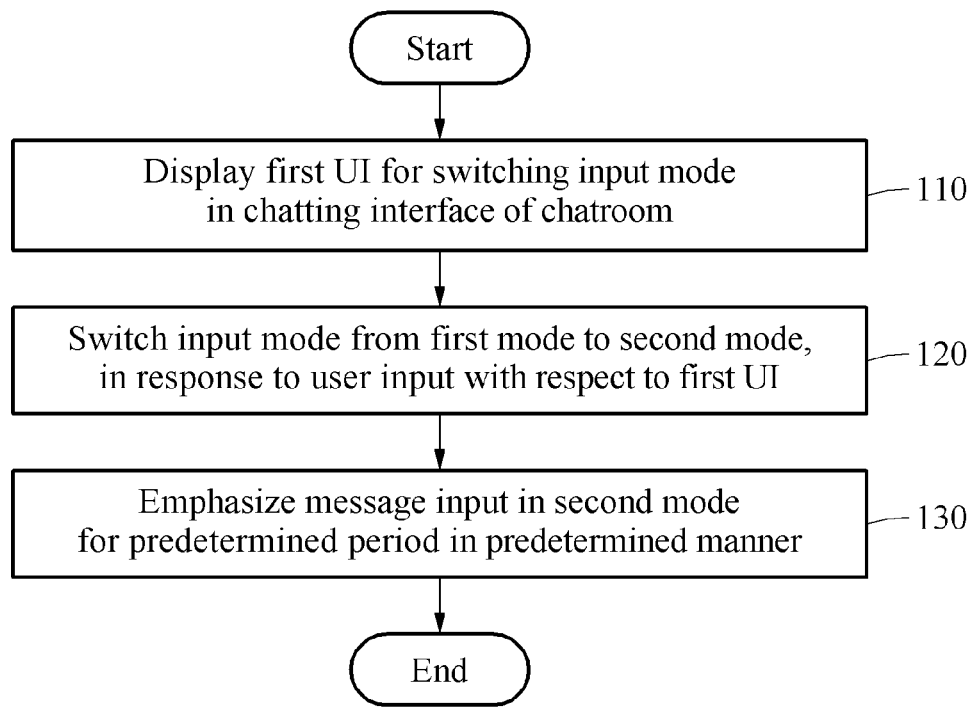
FIG. 1 is a flowchart illustrating a method of operating an application according to an example embodiment.

Hereinafter, some example embodiments will be described in detail with reference to the accompanying drawings. Various modifications may be made to the example embodiments. Here, the examples are not construed as limited to the disclosure and should be understood to include all changes, equivalents, and replacements within the idea and the technical scope of the disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. When it is determined detailed description related to a related known function or configuration may make the purpose of the example embodiments unnecessarily ambiguous in describing the example embodiments, the detailed description will be omitted here.

FIG. 1 is a flowchart illustrating a method of operating an application according to an example embodiment. Referring to FIG. 1, in operation 110, a terminal may display a first user interface (UI) for switching an input mode in a chatting interface of a chatroom in which a user of an application is participating, based on whether the user is assigned an authority to emphasize a message in the chatroom. In this example, the terminal may be a terminal on which an application for an instant messaging service is installed. The user of the application may be construed as including a user account for the instant messaging service. Further, the chatroom in which the user is participating may include a group open chatroom in which anonymous users participate and/or a general group chatroom in which users having a relationship as friends participate. Here, the group open chatroom in which anonymous users participate may is a chatroom in which any users are allowed to participate through link information irrespective of whether the users have a relationship as friends in a message application.

The "authority" to emphasize a message may be assigned to a representative of the chatroom or a user selected or designated by the representative. The authority may include, for example, a first authority assigned to a representative of a chatroom, and a second authority assigned to at least one participant selected by a possessor of the first authority.

The representative of the chatroom may be determined using a predetermined scheme. For example, a user creating the chatroom may be automatically designated as the representative of the chatroom. A user elected by the participants of the chatroom may be designated as the representative of the chatroom. A user taking over an authority of a representative from a former representative may be designated as the representative of the chatroom. In addition to the schemes described above, the scheme of designating a representative may be modified in various manners. The representative of the chatroom may lead an activity in the chatroom by utilizing a function of emphasizing a message, which will be described in detail below.

Hereinafter, a user assigned the first authority will be referred to as a "leader" of the chatroom, and a user assigned the second authority will be referred to as a "subleader." Among users participating in the chatroom, users unassigned an authority like the leader or the subleader will be referred to as "general participants."

The terminal may display the first UI in the chatting interface of the terminal when the user is assigned the authority, and may not display the first UI when the user is unassigned the authority.

Authority information may be managed by a server for the instant messaging service, or managed by the terminal. Whether the user (or a user account) is assigned the authority to emphasize a message may be verified through creator information corresponding to a link of the group open chatroom.

When the authority information is managed by the service for the instant messaging service, the terminal may verify whether the user (or the user account) is assigned the authority by inquiring of the server. The terminal may verify whether the user (or the user account) is assigned the authority through an indication from the server.

The server may directly or indirectly inform the terminal about whether the user is assigned the authority. For example, the server may transmit information related to the authority of the user to the terminal. In this example, the terminal may be directly aware of whether the user is assigned the authority, and determine whether to display the first UI based on whether the user is assigned the authority. In another example, the server may transmit information to control the chatting interface displayed on the terminal, rather than transmitting the information related to the authority of the user to the terminal. The terminal may display the chatting interface based on the information received from the server. In this example, the terminal may be indirectly aware of whether the user is assigned the authority.

When the authority information is managed by the terminal, the terminal may immediately verify whether the corresponding user is assigned the authority, without receiving an instruction from the server or inquiring of the server. The terminal may determine whether to display the first UI based on whether the user is assigned the authority.

The chatting interface in which the first UI is displayed may be an interface providing the instant messaging service through the display of the terminal. The chatting interface may be, for example, a screen 210 of FIG. 2A. The chatting interface my include a message region, an input region, and a virtual keyboard region. The chatting interface will be described further below with reference to FIGS. 2A and 2B.

Figure 2A:
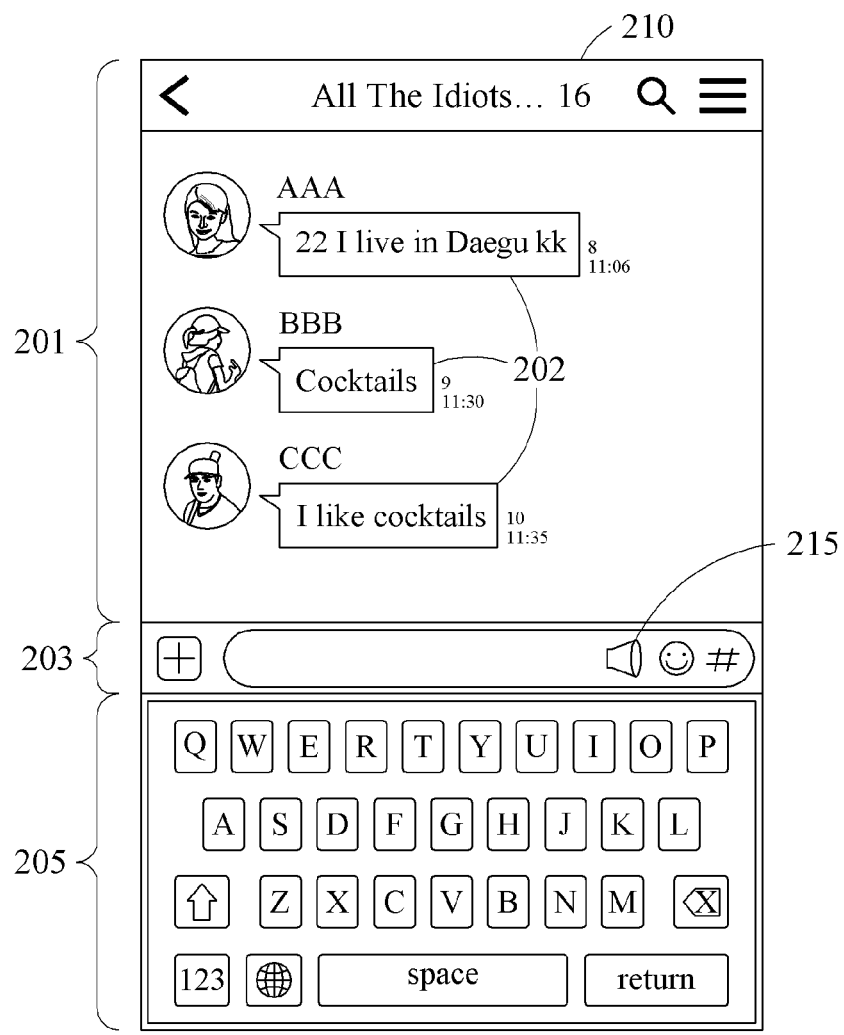
FIGS. 2A through 3 illustrate an example of inputting a message by switching an input mode to a second mode according to an example embodiment.

The terminal may display the first UI in the message region, for example, a message region 201 of FIG. 2A, or may display the first UI in the input region, for example, an input region 203 of FIG. 2A. The first UI may be represented in various forms, for example, an icon or a button in a shape of a megaphone or a trumpet, indicating switching of the input mode.

In operation 120, the terminal may switch the input mode from a first mode which is a normal mode to a second mode for emphasizing a message, in response to a user input with respect to the first UI. The "first mode" may be a basic mode to receive an input of a link, an image, or a chatting message for a chat between users participating in a chatroom in an instant messaging service. The "second mode" may be a special mode to receive an input of an announcement or a message desired to be emphasized in a manner different from a general manner.

In operation 120, the terminal may detect the user input by a first touch at a location on a touch-sensitive display corresponding to a location of the first UI in the chatting interface. The terminal may switch the input mode from the first mode to the second mode, in response to a detection of the user input by the first touch. The first touch may be, for example, a touch or a long press. An example in which the terminal switches the input mode to the second mode and an example in which the terminal inputs a message in the second mode will be described further with reference to FIGS. 2A and 2B and FIG. 3, respectively.

The terminal may provide a function to emphasize a message, without switching the input mode. For example, the terminal may immediately emphasize a message input through an input region, for example, the input region 203 of FIG. 2A, in the chatting interface, rather than switching the input mode, in response to the user input with respect to the first UI. In the following example embodiments, a "message input in the second mode" may include a message emphasized through the first UI.

In operation 130, the terminal may emphasize the message input in the second mode for a predetermined period in a predetermined manner. The terminal may display the message input in the second mode for the predetermined period in a predetermined region different from the message region of the chatting interface. In this example, the "predetermined period may be a time period during which the message input in the second mode is to be emphasized, for example, 3 seconds, 5 seconds, or 10 seconds.

The "predetermined region" may be a location fixed irrespective of a sequential flow of chatting messages in the message region of the chatting interface. The location fixed irrespective of the sequential flow of the chatting messages may be, for example, a region at an upper end of the chatting interface. The predetermined region may overlay an announcement region registered in advance in the chatting interface. The predetermined region may be a location belonging to a chatting message corresponding to the message input in the second mode, among the chatting messages in the message region of the chatting interface.

Here, "emphasizing" may refer to displaying the message input in the second mode in various manners which attract an attention of users, for example, displaying the message input in the second mode in the predetermined region different from the message region of the chatting interface, or displaying the message input in the second mode using special effects. The special effects may include, for example, an effect of flickering the message input in the second mode at a predetermined time interval, an effect of displaying the message input in the second mode in a bright color or a fluorescent color like an electronic display board, an effect of displaying the message input in the second mode in a large font size, an effect of displaying the message input in the second mode in bold, an effect of changing a font color of the message input in the second mode, an effect of underlying the message input in the second mode, and various combinations thereof. However, the example embodiments are not limited thereto. For example, the special effects may be set by the leader and/or the subleader.

The message input in the second mode may include, for example, at least one of text information, audio information, and image information. The text information may include, for example, a text and an emoticon. The audio information may include, for example, a voice, a music, a sound produced in the nature such as an animal sound, a bird sound, a water sound, or a wind sound, and a sound produced in our daily lives such as a train sound, a car sound, or other living noise. The image information may include, for example, a photo, a still image, a small size video such as a broadcast clip image, an animated graphics interchange format (GIF) image, or a meme image, and a large size video such as a movie. For example, when the message input in the second mode corresponds to the audio information, the terminal may emphasize the message by automatically playing back the audio information for the predetermined period. When the message corresponds to image information, the terminal may emphasize the message by displaying a thumbnail image of the image information for the predetermined period. Examples in which the terminal emphasizes the message input in the second mode will be described further with reference to FIGS. 4A through 4C.

When the predetermined period elapses, the terminal may cancel the emphasizing of the message input in the second mode. In this example, whether the predetermined period elapses may be determined by the terminal, or may be verified through an indication from the server. In another example, whether the predetermined period elapses may be determined by the server, and the server may transmit an instruction to cancel the emphasizing of the message to the terminal.

The predetermined period may be adjusted based on feedback from users responding to the message input in the second mode. For example, when a number of the feedbacks from the users is greater than a preset reference number, the predetermined period may be increased. When the number of the feedbacks from the users is less than the preset reference number, the predetermined period may be reduced.

The terminal may display the message input in the second mode as a chatting message in the message region of the chatting interface after switching to the second mode in operation 120. In the message region, the message input in the first mode and the message input in the second mode may not be distinguished from each other.

The message input in the second mode may be emphasized in the message region. For example, the message input in the second mode may be displayed together with a separate icon indicating emphasizing of a message, or displayed in a speech balloon different from a normal speech balloon. In this example, even after the emphasizing is cancelled, the message input in the first mode and the message input in the second mode may not be distinguished from each other. In another example, a normal message displayed on the chat records and the emphasized message may be displayed distinguishably in the message region.

By storing a type of the message input in the first mode and a type of the message input in the second mode to be distinguished from each other, type information may be utilized in various fields, for example, to selectively search for only messages input in the second mode.

Figure 2B:
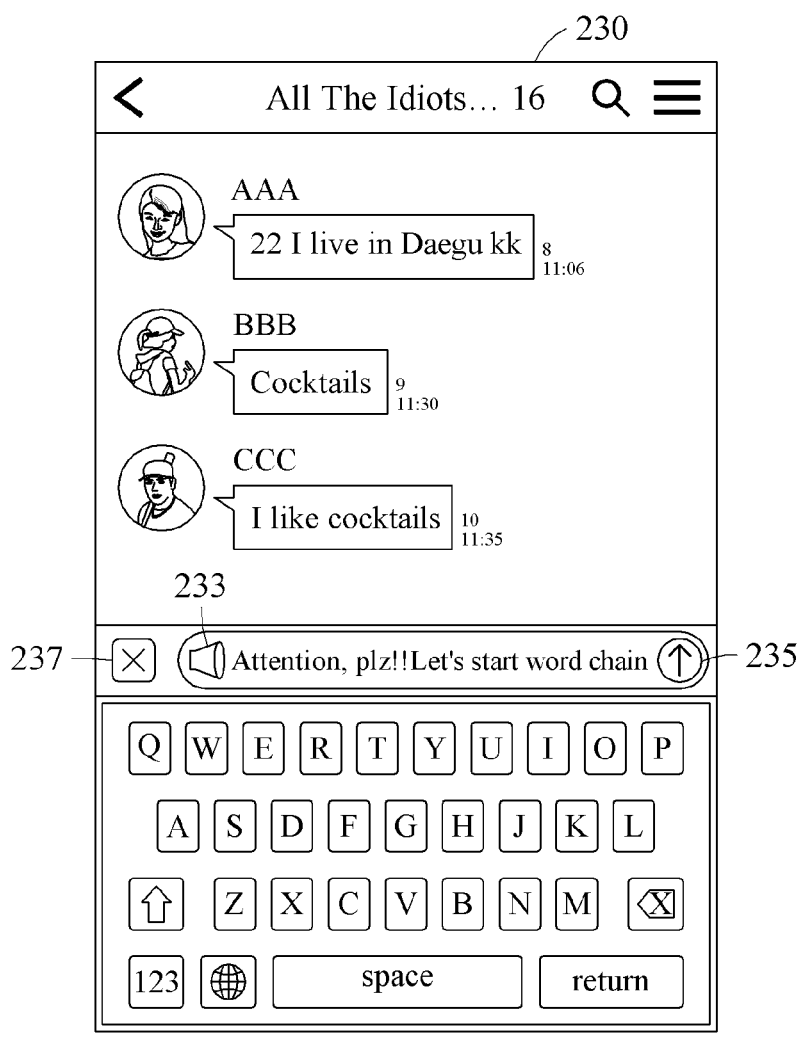

FIGS. 2A and 2B illustrate an example of inputting a message by switching an input mode to a second mode according to an example embodiment. Referring to FIG. 2A, the screen 210 displaying a first UI 215 for switching an input mode may be displayed. The screen 210 may be an example of a chatting interface screen displayed on a display of a terminal on which an application for an instant messaging service is installed. The screen 210 may be, for example, a screen of a chatting interface provided when a user of the corresponding application is assigned an authority to emphasize a message. The screen 210 may include, for example, the message region 201, the input region 203, and a virtual keyboard region 205. The message region 201 may be a region in which chatting messages exchanged between the user of the terminal and users of one or more other terminals using the instant messaging service are displayed. The chatting messages displayed in the message region 201 may be sequentially displayed based on a sequential flow of the chatting messages. The user may verify a chatting history through the chatting messages displayed in the message region 201.

The virtual keyboard region 205 may be normally concealed, and displayed through the chatting interface when the user selects or touches the input region 203.

The input region 203 may be a region into which a chatting message is input by the user. The input region 203 may include the first UI 215 for switching an input mode. Here, for ease of description, an example in which the first UI 215 is included in the input region 203 will be described. However, in some examples, the first UI 215 may be displayed at a different location on the chatting interface.

The user assigned the authority may select the first UI 215 in the screen 210. In this example, the terminal may switch the input mode from a first mode which is a normal mode to a second mode for emphasizing a message, in response to a user input with respect to the first UI 215.

Referring to FIG. 2B, in response to switching of the input mode to the second mode, the terminal may display an icon 233 in the same form as the first UI 215 at the beginning of the input region 203, as shown in a screen 230, such that the user may recognize that the input mode is switched to the second mode. The icon 233 may be in the same form as the first UI 215, as shown in the screen 230, or in another form which allows the user to recognize or perceive mode switching.

The terminal may recognize, as a message input in the second mode, a message input by the virtual keyboard region 205 after the user selects the first UI 215 in the screen 210. In this example, a length of the message input into the input region 203 is not limited. However, when the message input into the input region 203 is emphasized in a predetermined region different from the message region of the chatting interface later, the length of the message may be limited to a predetermined number of characters or a predetermined length. When the message emphasized in the predetermined region is limited to the predetermined number of characters or the predetermined length, the whole content of the message may be provided to the user through an additional input. For example, the user may verify the whole content of the message through an additional input with respect to the message emphasized by omitting some information, or an additional input with respect to the predetermined region in which the corresponding message is emphasized.

When inputting the message into the input region 203 is completed, the user may select an upload button 235 such that the terminal may transmit the message input in the second mode to a chatroom. The message input in the second mode may be displayed in the message region of the chatting interface as a chatting message on screens of users participating in the chatroom, and emphasized for a predetermined period in a predetermined manner. The message transmitted to the chatroom when the user selects the upload button 235 may be shown, for example, as in FIG. 4A. The example of FIG. 4A will be described in detail later.

In an example, the user may cancel the second mode by selecting an x icon 237 displayed in the input region 203 on the screen 230. When the user cancels the second mode by selecting the x icon 237 while inputting a message in the second mode, the message input in the second mode may be deleted. When the user selects the upload button 235 on the screen 230 and maintains the virtual keyboard region 205 being displayed, the second mode may be maintained continuously. However, when a back button is selected to conceal the virtual keyboard region 205, the second mode may be cancelled.

Figure 3:
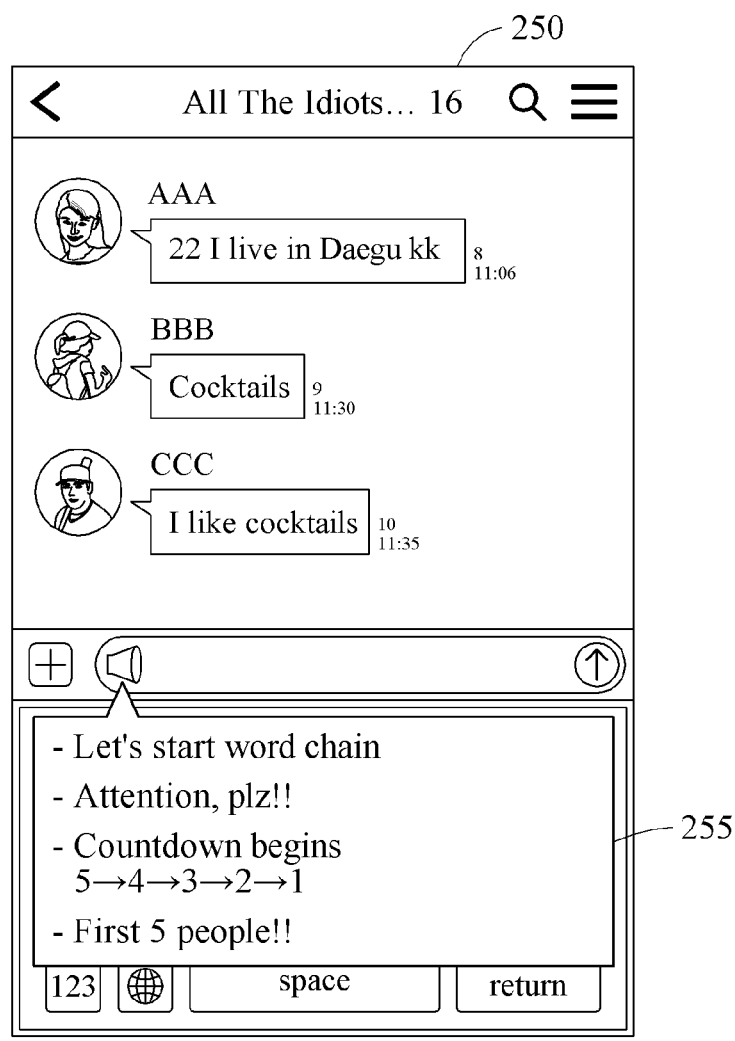

FIG. 3 illustrates an example of inputting a message in a second mode according to an example embodiment. Referring to FIG. 3, a screen 250 displaying a message set 255 including a plurality of messages provided in advance for a second mode in a chatting interface is illustrated.

When an input mode is switched to a second mode, a terminal may display the message set 255 including the plurality of messages provided in advance for the second mode in the chatting interface. In this example, the plurality of messages provided in advance for the second mode may include, for example, a game guide message ("Let's start word chain"), a countdown message ("Countdown begins"), and others message ("First 5 people!!").

The message set 255 may be displayed at least a portion of the virtual keyboard region 205, as shown in FIG. 3. The message set 255 may be overlaid in the message region 201, or displayed in a form of a separate speech bubble or window across at least a portion of the input region 203 and the message region 201. The message set 255 may be concealed in the chatting interface, and displayed in chatting interface when the user selects the icon 233 displayed in the input region 203 as shown in FIG. 2B in response to switching to the second mode. An example in which the message set 255 is displayed in the chatting interface is not limited to the examples described above. The message set 255 may be displayed in various other forms.

The terminal may receive a user input selecting one of the messages included in the message set 255, and emphasize the selected message as a message input in the second mode for a predetermined period in a predetermined manner.

The messages included in the message set 255 may be provided by an enterprise providing an instant messaging service, or set by the user. The message set 255 may include a macro message which is a predetermined message automatically sent over time. For example, when the countdown message is selected, a message saying "Countdown begins" may be input in the second mode, and messages saying "5," "4," "3," "2," and "1" may be automatically input in the second mode sequentially over time.

Figure 4A:
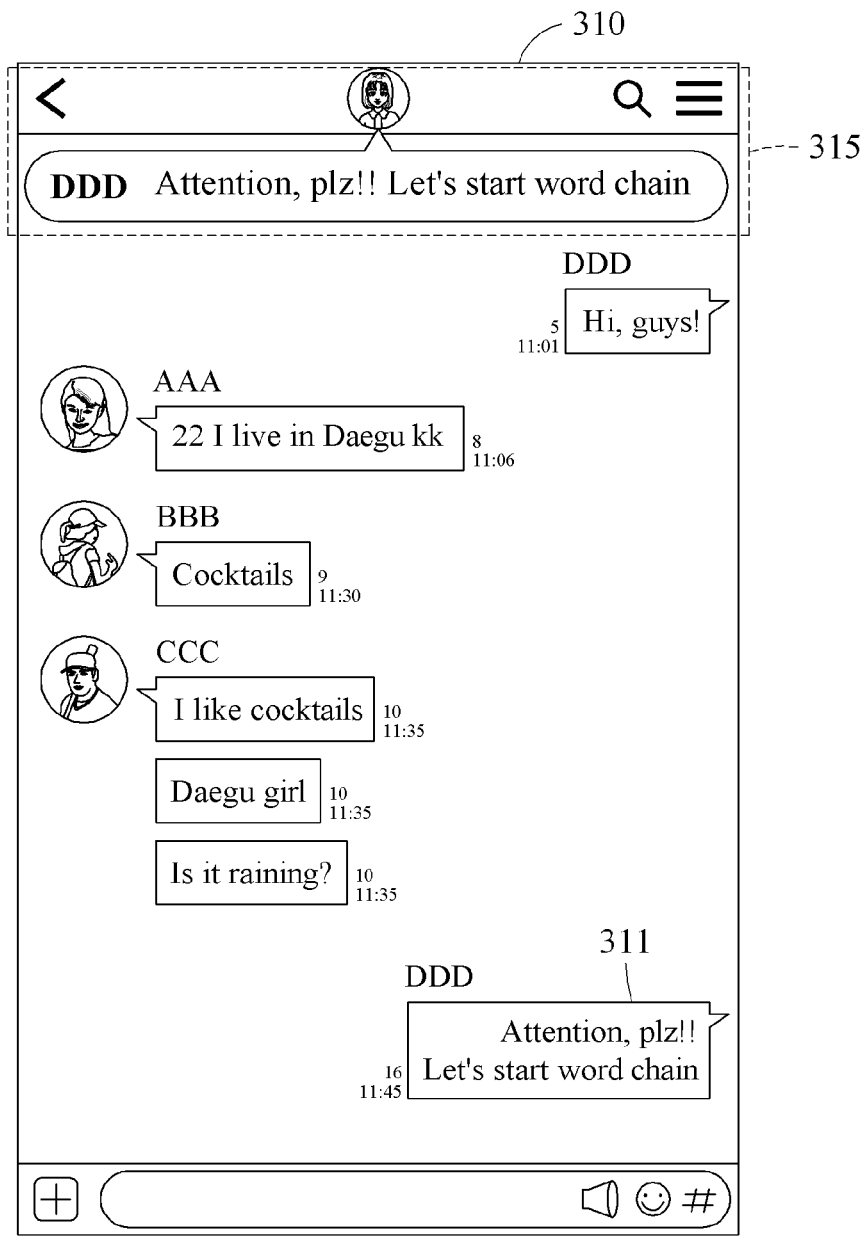
FIGS. 4A through 4C illustrate examples of emphasizing a message input in a second mode according to an example embodiment.
Figure 4B:
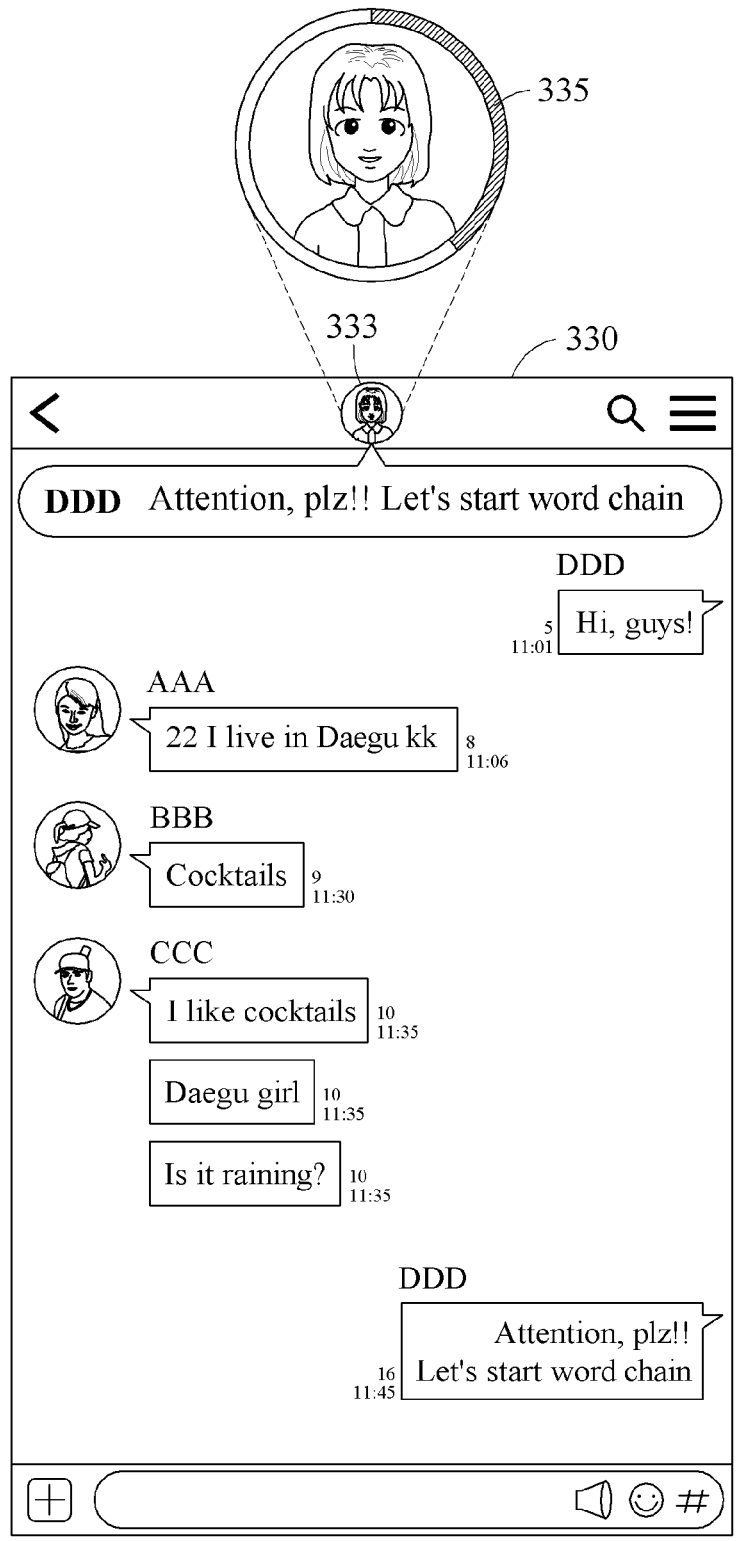
Figure 4C:
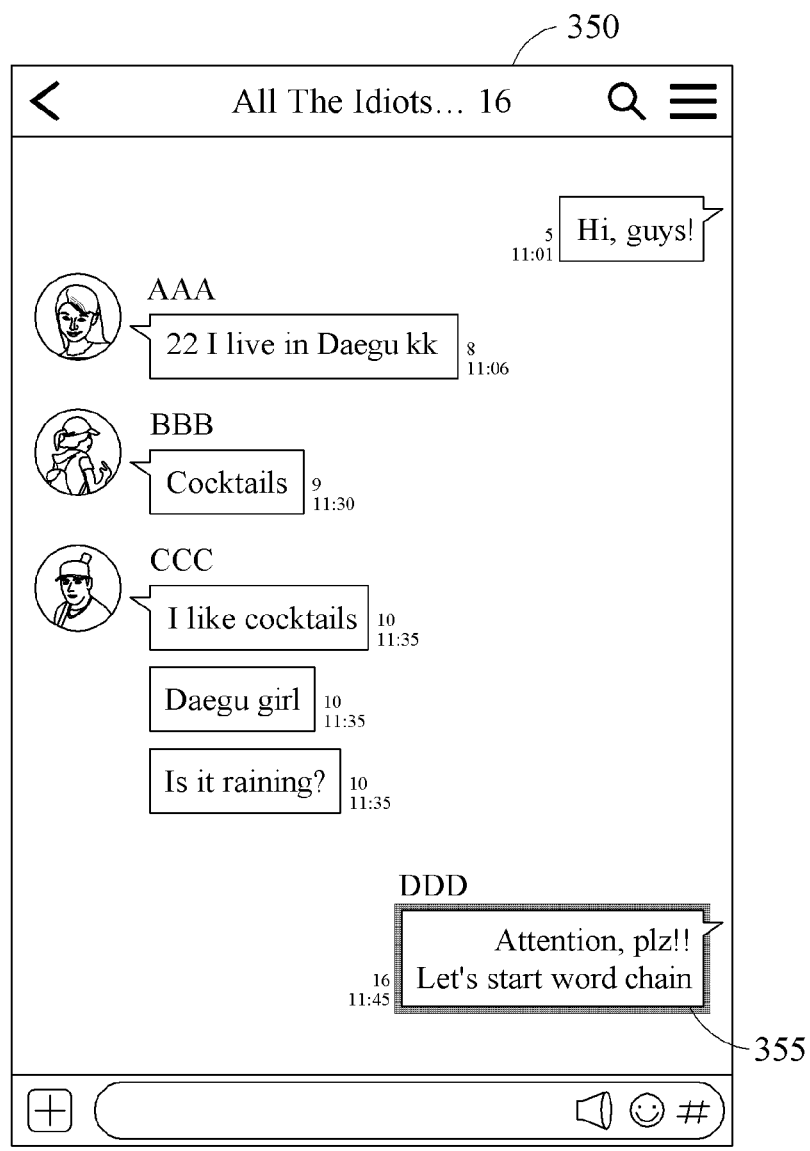

FIGS. 4A through 4C illustrate an example of emphasizing a message input in a second mode according to an example embodiment. Referring to FIG. 4A, a screen 310 displaying a message input in a second mode in a message region 311 of a chatting interface and in a predetermined region 315 different from the message region 311 is illustrated.

When a message input by a user assigned an authority in the second mode is transmitted to a chatroom through a server, the corresponding message may be displayed as a chatting message in the message region 311 of the chatting interface, simultaneously displayed in the predetermined region 315 different from the message region 311 of the chatting interface for a predetermined period (for example, 3 seconds, or 5 seconds). In this example, the message input in the second mode may be displayed in the predetermined region 315, together with at least one of identification information (for example, a nick name such as "DDD") of the user set for the chatroom and a profile photo (refer to a profile photo 333 of a screen 330 of FIG. 4B) of the user set for the chatroom. A duration for displaying the message in the predetermined region 315 may be represented, for example, by a band 335 displayed enclosing the profile photo 333 as shown in the screen 330 of FIG. 4B. The band 335 enclosing the profile photo 333 may be gradually filled or emptied as a time for displaying the message input in the second mode in the predetermined region 315 elapses.

In an example, the user may select the message displayed in the predetermined region 315 on the screen 310 of FIG. 4A, thereby concealing the message from the chatting interface before the predetermined period elapses. In detail, the terminal may detect a user input by a second touch at a location on a touch-sensitive display corresponding to a region (the predetermined region 315) of the message emphasized in the chatting interface. In response to a detection of the user input by the second touch, the terminal may cancel the emphasizing of the message input in the second mode before the predetermined period elapses. In this example, the second touch may be, for example, a tab or a touch. Various other touch manners may be applied thereto, but not limited thereto.

Referring to FIG. 4C, a screen 350 emphasizing the message input in the second mode in a message region 355 of the chatting interface for a predetermined period in a predetermined manner is illustrated.

The terminal may emphasize the message input in the second mode in the message region 355 of the chatting interface in the predetermined manner, for example, by flickering the corresponding message at a predetermined time interval, displaying the corresponding message in a bright color or a fluorescent color like an electronic display board, displaying the corresponding message in a large font size, displaying the corresponding message in bold, changing a font color of the corresponding message, underlying the corresponding message, or through a combination thereof.

As shown in the screen 350 of FIG. 4C, when the message input in the second mode is emphasized in the message region 355, an emphasizing scheme through a separate, predetermined region (for example, the top of the screen) may be omitted. However, in an example, the two emphasizing schemes may be used simultaneously.

The emphasized representations described through the screens 310, 330, and 350 may be identically provided to the user assigned the authority and also to general participants of the chatroom.

In an example, a plurality of participants may have the authority to emphasize a message. In this example, the terminal may display a last message input in the second mode with a higher priority. For example, when a first message input by a user of the terminal in the second mode and a second message input by another user of another terminal in the second mode are transmitted to the chatroom, the terminal may display one, of the first message and the second message, input later in the predetermined region. For this, the terminal may cancel the emphasizing of the first message before the predetermined period elapses, when a second message input in the second mode is received from the user or the other user having the authority. Then, the terminal may emphasize the second message for the predetermined period in the predetermined manner.

FIGS. 5A through 7 illustrate an example of displaying a second UI for inputting a feedback responding to a message input in a second mode according to an example embodiment.

Figure 5A:
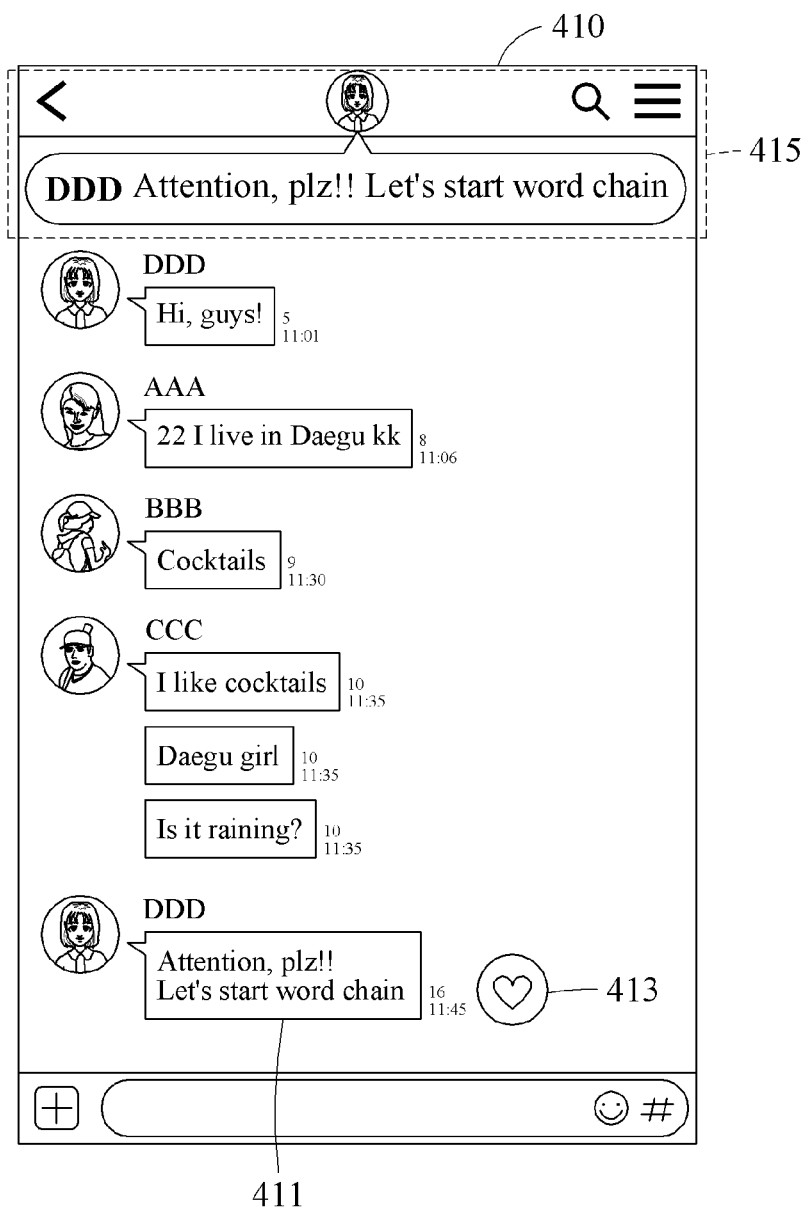
FIGS. 5A through 7 illustrate an example of displaying a second user interface (UI) for inputting a feedback on a message input in a second mode according to an example embodiment.
Figure 5B:
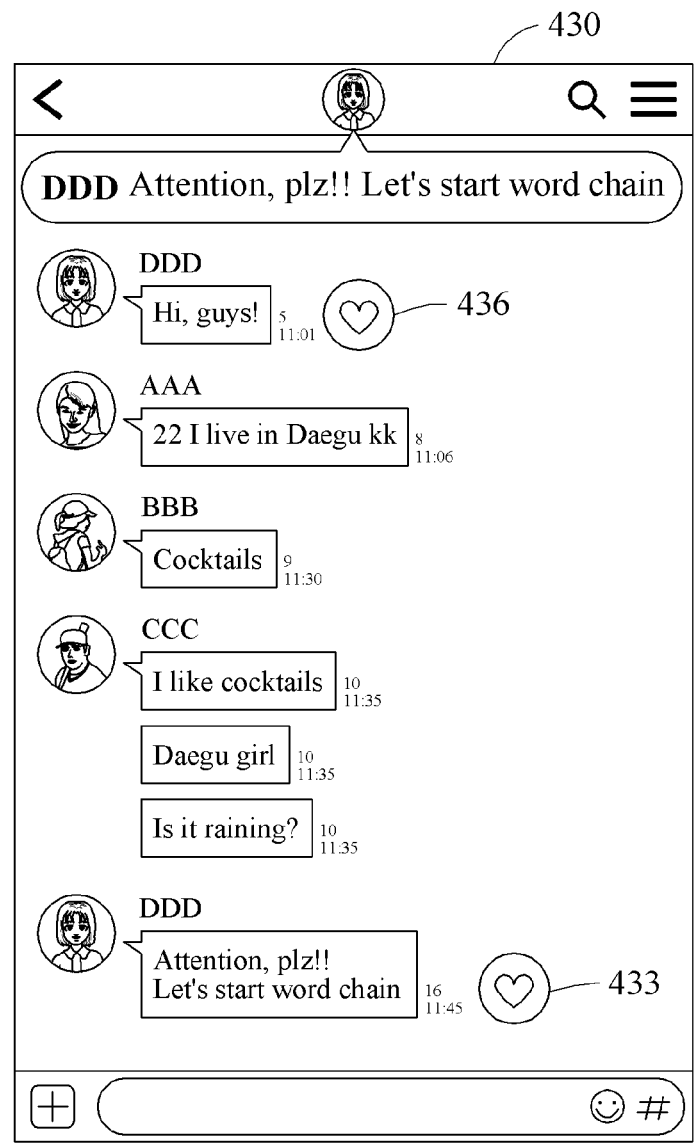

Referring to FIG. 5A, a screen 410 displaying a second UI 413 for inputting a feedback responding to a message input in a second mode is illustrated. The screen 410 may correspond to, for example, a screen provided when a user of a corresponding application is not assigned an authority to emphasize a message, that is, a screen of a chatting interface provided on a terminal of a general participant. In this example, a first UI may not be displayed on the screen 410, unlike the screen 210.

Referring to the chatting interface of the screen 410, when a message input by a user assigned the authority in the second mode is transmitted to a terminal of a general participant of a chatroom receiving the message, the terminal of the general participant receiving the message may display the second UI 413 for inputting a feedback responding to the message input in the second mode, together with the emphasized message. For example, a leader (or a sub-leader) may transmit a message saying "Attention, plz!! Let's start word chain" in the second mode. In this example, the corresponding message may be emphasized in a message region 411 and/or a predetermined region 415. A general participant of the corresponding chatroom may select the second UI 413 in response to the message emphasized in the message region 411 and/or the predetermined region 415, thereby inputting a feedback responding to the message transmitted by the leader. The terminal may receive a user input with respect to the second UI 413, and represent a feedback using the chatting interface in response to the user input. A form in which the feedback is represented will be described in detail with reference to FIGS. 8A and 8B.

In this example, a period for displaying the second UI 413 in the chatting interface may change based on whether the second UI is coupled to the message input in the second mode. Here, the description "the second UI is coupled to the message input in the second mode" may indicate that the second UI is displayed only while the message input in the second mode is emphasized.

For example, when the second UI is coupled to the message input in the second mode, the terminal may display the second UI at a predetermined location in the chatting interface for the predetermined period. Conversely, when the second UI is not coupled to the message input in the second mode, the terminal may display the second UI at the predetermined location in the chatting interface continuously or for a preset period.

In this example, the predetermined location may include a fixed location (for example, a right bottom of the message region of the chatting interface) irrespective of a sequential flow of chatting messages in the message region of the chatting interface. Even when chatting messages in the message region of the chatting interface are updated, the location at which the second UI 413 is displayed may be fixed.

In an example, unlike the first UI, the second UI may be displayed in a chatting interface of every user participating in the chatroom, irrespective of whether the corresponding user is assigned the authority to emphasize a message, such that feedbacks may be received from all the users participating in the chatroom.

The predetermined location may include a location belonging to a chatting message corresponding to the message input in the second mode, among the chatting messages. Referring to a screen 430 of FIG. 5B, the second UI may be displayed at a location, for example, a left location or a right location 433 or 436, belonging to a chatting message corresponding to the message input in the second mode, among the chatting messages.

As described above, when the second UI is coupled to the message input in the second mode, the second UI may be displayed at the location 436 belonging to a chatting message ("Hi, guys!") or the location 433 belonging to a chatting message ("Attention, plz!! Let's start word chain") corresponding to the message input in the second mode, among the chatting messages. In this example, the location 433 or 436 belonging to the chatting message corresponding to the message input in the second mode may change along when the location of the chatting message changes based on a sequential flow in the chatting interface.

Figure 6:
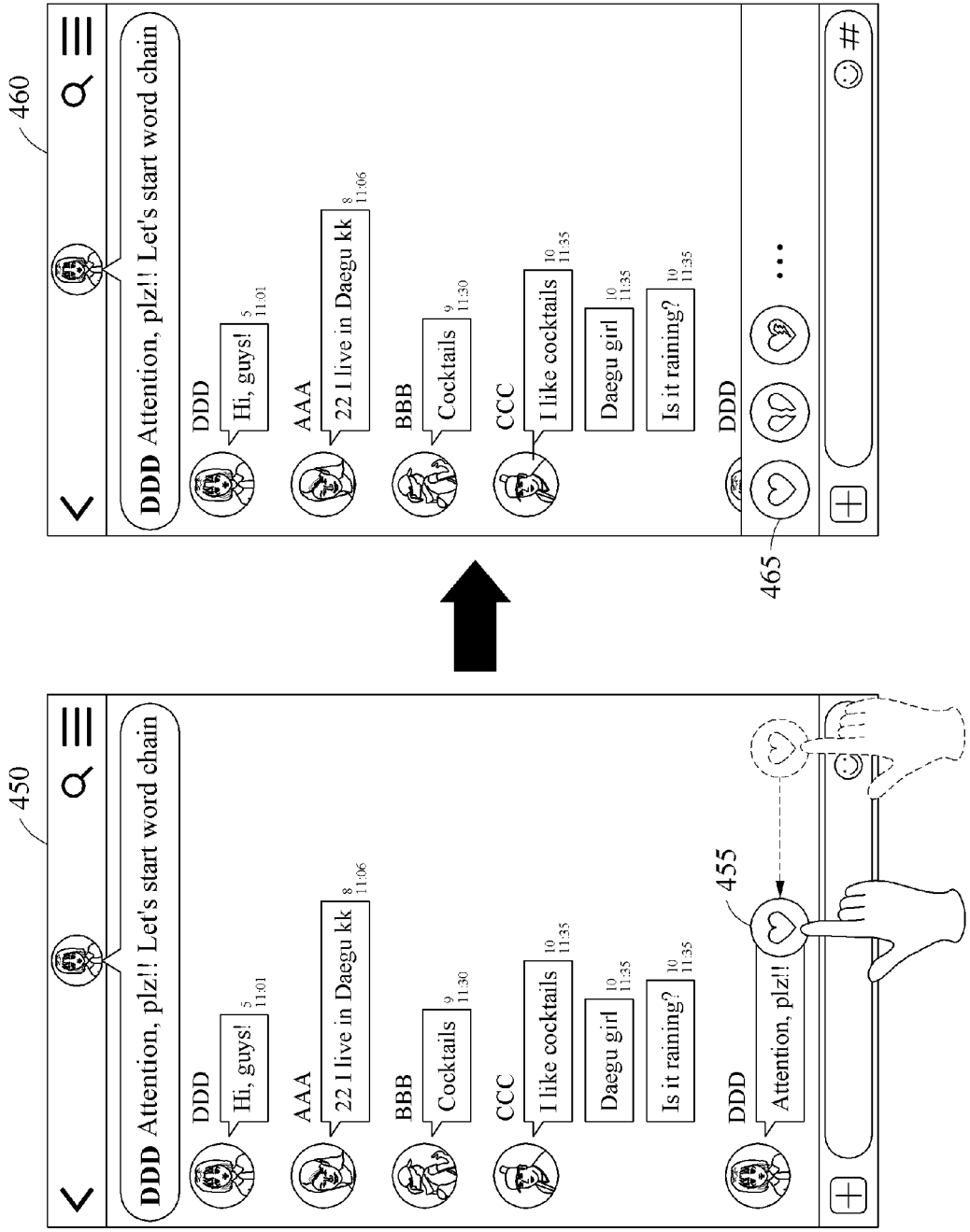
Figure 7:
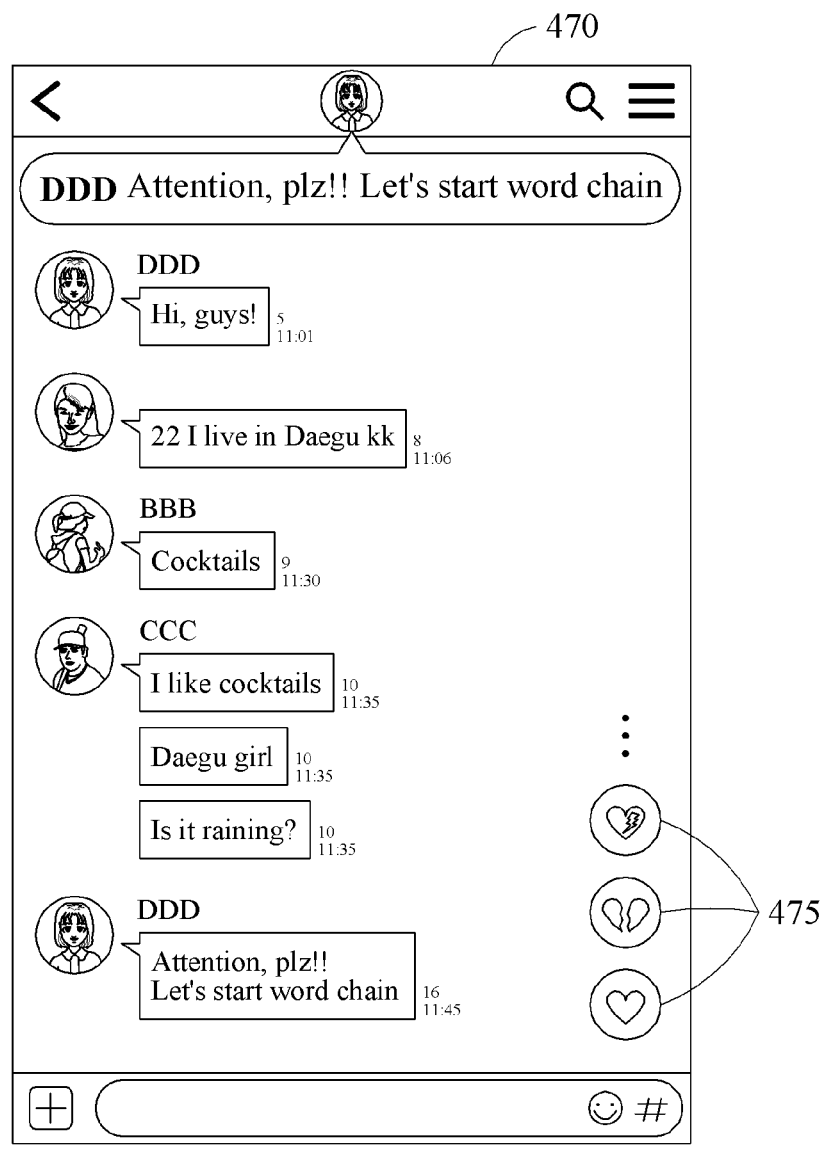

Referring to FIGS. 6 and 7, screens 450, 460, and 470 for receiving a feedback responding to the message input in the second mode are illustrated.

The terminal may provide multiple second UIs 465 for expressing various emotions as in the screen 460, when a swipe input with respect to a second UI 455 displayed in the chatting interface is received as shown in the screen 450 of FIG. 6. In this example, the multiple second UIs 465 may include UIs corresponding to various emotions, for example, "love," "like," "dislike," and "hate." However, the various emotions are not limited thereto. The multiple second UIs 465 may be displayed in an input region of the chatting interface. In this example, the swipe input may also be received through the input region. In some examples, multiple UIs for expressing various emotions may be displayed directly in the chatting interface, like second UIs 475 of FIG. 7.

In this example, the multiple second UIs for expressing various emotions may be listed vertically or horizontally in the chatting interface as shown in the screen 470, and displayed in the chatting interface or through a separate window or a separate menu list overlaid in the chatting interface. Further, the multiple second UIs for expressing various emotions may be displayed in a form of the menu list overlaid in the input region of the chatting interface, or displayed in a form of a separate speech balloon or window across at least a portion of the message region and the input region.

The user may access the second UIs for expressing various emotions through a long touch (or short touch) with respect to the second UIs 475 of FIG. 7, in addition to the swipe input as shown in the screen 450.

When the second UI is coupled to the message input in the second mode, the terminal may receive a swipe input with respect to a second UI from a user while the second mode is maintained. Conversely, when the second UI is not coupled to the message input in the second mode, the terminal may receive the swipe input with respect to the second UI from the user all the times or a predetermined period, irrespective of whether the second mode is maintained.

Although not shown in the drawings, the terminal may provide the user with a separate UI indicating that a swipe input for the plurality of second UIs is available, through the chatting interface.

Figure 8A:
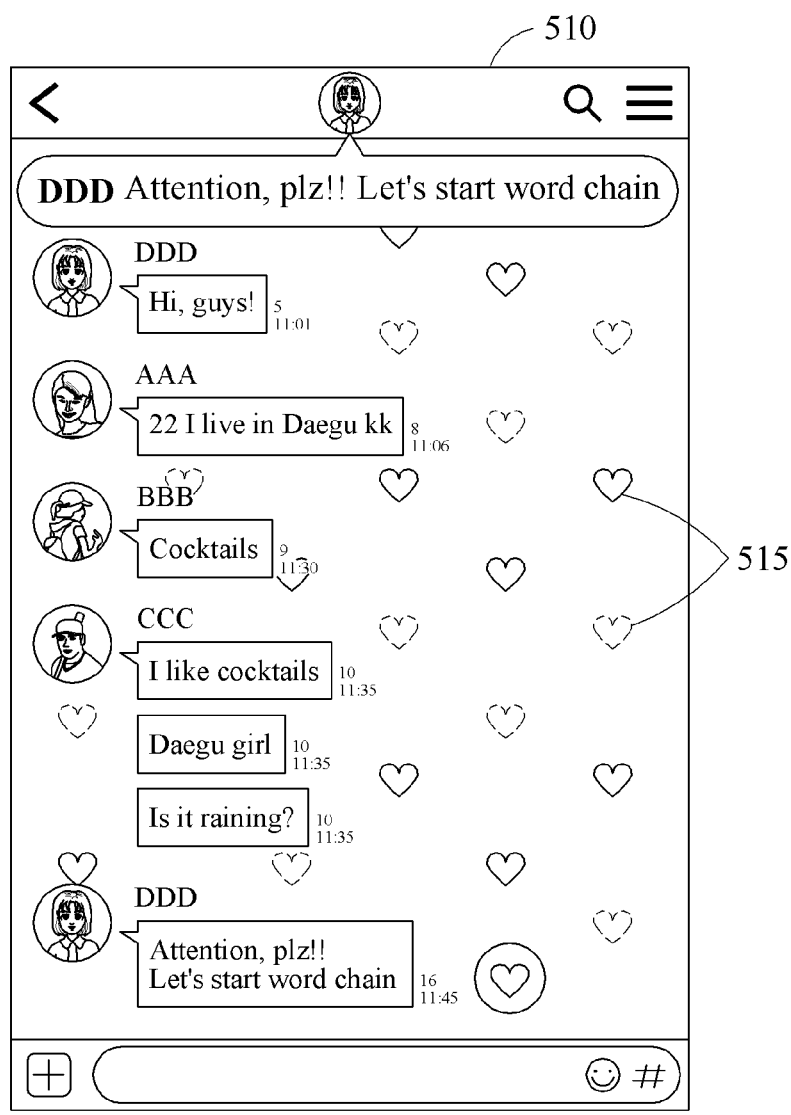
FIGS. 8A and 8B illustrate an example of representing a feedback in response to a user input with respect to a second UI according to an example embodiment.
Figure 8B:
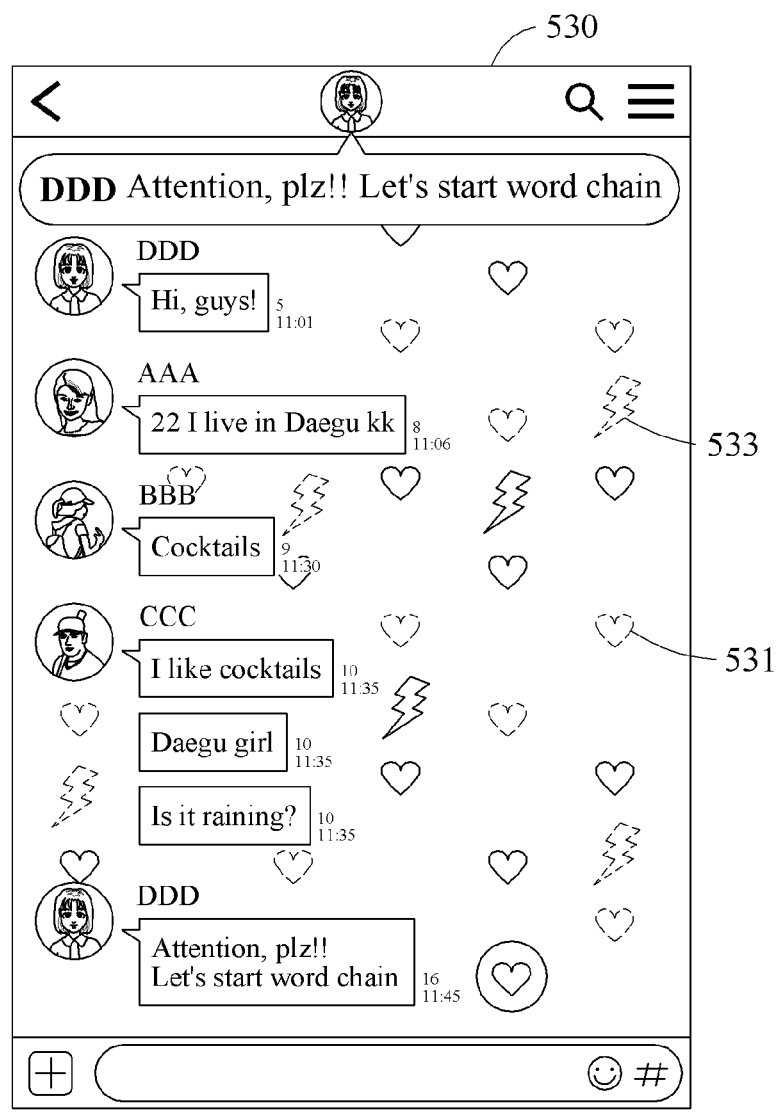

FIGS. 8A and 8B illustrate an example of representing a feedback in response to a user input with respect to a second UI according to an example embodiment. Referring to FIGS. 8A and 8B, screens 510 and 530 indicating feedbacks corresponding to user inputs with respect to a second UI in a chatting interface based on the user inputs are illustrated.

The terminal may apply an animation effect corresponding to a feedback to a background of a message region in the chatting interface, based on a user input with respect to the second UI. For example, as shown in the screen 510 of FIG. 8A, the terminal may apply an animation effect to hearts 515 such that the hearts 515 may fly on the background of the message region in the chatting interface. In this example, the animation effect corresponding to the feedback may be applied only to a terminal receiving the user input with respect to the second UI, or applied to terminals of all participants of a chatroom.

When user inputs (feedbacks) with respect to the second UI are received from terminals of multiple users participating in the chatroom, animation effects may be accumulated and increased in proportion to the multiple user inputs. For example, when the animation effects are accumulated and increased, the number of the hears 515 displayed on the screen 510 of FIG. 8A may increase, the size, the color, or the movement of the hearts 515 may increase. In addition, when the number of user inputs (feedbacks) with respect to the second UI is greater than or equal to a predetermined number, a separate animation effect may be applied. For example, the total number of users participating in a chatroom may be "100." When feedbacks are input from terminals of more than 50 users are input, a separate animation effect different from the animation effect of flying a number of hearts 515 (for example, an effect of twinkle starts or moons which are different from hearts and/or an effect of flickering the hearts 515) may be applied. In this example, an existing animation effect and the separate animation effect may be displayed together, or only the separate animation effect may be displayed instead of the existing animation effect.

Further, when the users provides feedbacks expressing various emotions through the second UIs as shown in FIGS. 6 and 7, the terminal may display respective feedbacks corresponding to the plurality of emotions differently, like hearts 531 and thunderbolts 533 shown in the screen 530 of FIG. 8B. In this example, the hears 531 may be feedbacks corresponding to a "like" emotion, and the thunderbolts 533 may be feedbacks corresponding to a "dislike" emotion.

For example, eighteen user inputs with respect to the second UI corresponding to the "like" emotion may be provided from users of the chatroom, and six user inputs with respect to the second UI corresponding to the "dislike" emotion may be provided. The terminal may display more feedbacks (for example, hearts 531) corresponding to the "like" emotion than feedbacks (for example, thunderbolts 533) corresponding to the "dislike" emotion by cumulatively summing up the user inputs from the users of the chatroom.

In some example, the terminal may finally display only feedbacks corresponding to a majority of emotions by cumulatively summing up user inputs corresponding to the emotions from the users of the chatroom, or reduce a previous animation effect (for example, reduce the number of hearts corresponding to "like") by subtracting the user inputs corresponding to a second emotion (for example, a negative emotion such as "dislike") from the user inputs corresponding to a first emotion (for example, a positive emotion such as "like").

Although not shown in the drawings, the terminal may include a processor, a memory, a communication interface, and a touch-sensitive display. The processor, the memory, the communication interface, and the touch-sensitive display may be connected to each other through a communication bus. The terminal may be, for example, a personal computer (PC), a notebook, a potable terminal, a smart phone, a wearable device, or a user device that performs the same or similar function.

The processor may display a first UI for switching an input mode in a chatting interface of a chatroom in which a user of an application is participating, based on whether the user is assigned an authority to emphasize a message in the chatroom. The processor may switch the input mode from a first mode which is a normal mode to a second mode for emphasizing a message, in response to a user input with respect to the first UI, and emphasize a message input in the second mode for a predetermined period in a predetermined manner.

In addition, the processor may perform the at least one method described with reference to FIGS. 1 through 8B or an algorithm corresponding to the at least one method. The processor may execute a program and control the terminal. Program codes executed by the processor may be stored in the memory.

The communication interface may facilitate communication with other devices through one or more external ports, and include various software components to handle data received by the external ports and/or radio frequency (RF) circuits.

The touch-sensitive display may include various software components to perform various operations associated with detection of a touch (for example, by a finger or by a stylus), such as, for example, an operation of determining whether a touch occurs (for example, detecting a finger-down event), an operation of determining an intensity of a touch (for example, a force or pressure of the touch, or a replacement of the force or pressure of the touch), an operation of determining whether there is a touch movement and tracking a movement traversing a touch-sensitive surface (for example, detecting one or more finger-dragging events), and an operation of determining whether the touch is suspended (for example, detecting a finger-up event or a suspension of the touch. The touch-sensitive display may include the touch-sensitive surface, and receive touch data from the touch-sensitive surface. Determining a movement of a touch point represented by a series of touch data in the touch-sensitive display may selectively include determining a speed (magnitude), a velocity (magnitude and direction), and/or an acceleration (magnitude and/or change in direction) of the touch point. The above operations may be selectively applied to, for example, single-point touches (for example, single-finger touches or stylus touches) or multi-point touches (for example, "multi-touch"/multi-finger touches.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating a terminal on which an application for an instant messaging service is installed, the method comprising:
    displaying, by the terminal, a first user interface (UI) for switching an input mode in a chatting interface of a chatroom in which a user of the application is participating, based on whether the user is assigned an authority to emphasize a message in the chatroom;
    switching, by the terminal, the input mode from a first mode where no message emphasizing function is provided to a second mode where a message emphasizing function is provided, in response to a user input using the first UI;
    in response to switching of the input mode to the second mode, exposing a second UI within the chat interface of the chat room to allow the user to recognize that the input mode is switched to the second mode;
    emphasizing, by the terminal, a first message input in the second mode for a predetermined period in a predetermined manner; and
    cancelling, by the terminal, the emphasizing of the first message input in the second mode, when the predetermined time elapses,
    wherein the emphazing in the predetermined manner is i) to display the first message both in a message region of the chatting interface and in a predetermined region different from the message region where based on a sequential flow of chatting messages a location of the first message in the message region changes but a location of the first message in the predetermined region does not change, or ii) to add a visual or audio effect to the first message in the message region, which is not provided to a non-emphasized message,
    a third UI for inputting a feedback responding to the first message input in the second mode by the user assigned the authority is displayed in a second chatting interface of at least one user not assigned the authority, among users participating in the chatroom, for the predetermined period during which the first message input in the second mode is emphasized, and
    the displaying of the third UI is cancelled together in the second chatting interface of the at least one user, in response to the cancelling of the emphasizing of the first message input in the second mode when the predetermined time elapses.

2. The method of claim 1, wherein the emphasizing comprising displaying the first message input in the second mode together with at least one of identification information of the user set for the chatroom and a profile photo of the user set for the chartroom.

3. The method of claim 1, wherein the predetermined region overlays an announcement region.

4. The method of claim 1, wherein the message includes at least one of text information, audio information, and image information,
    wherein the emphasizing comprises at least one of:
    automatically playing back the audio information for the predetermined period, when the message corresponds to the audio information; and
    displaying a thumbnail image of the image information for the predetermined period, when the message corresponds to the image information.

5. The method of claim 1, further comprising:
    displaying, by the terminal, the third UI for inputting a feedback responding to the first message input in the second mode, in the chatting interface for the predetermined period during which the first message input in the second mode is emphasized; and
    cancelling, by the terminal, the displaying of the third UI together in the chatting interface, in response to the cancelling of the emphasizing of the first message input in the second mode when the predetermined time elapses.

6. The method of claim 1, wherein the terminal on which the application is installed comprises a touch-sensitive display,
    wherein the switching comprises:
    detecting the user input by a first touch at a location on the touch-sensitive display corresponding to a location of the first UI in the chatting interface; and
    switching the input mode from the first mode to the second mode, in response to a detection of the user input by the first touch.

7. The method of claim 1, further comprising:
    displaying, by the terminal, a message set including a plurality of messages provided in advance for the second mode, in the chatting interface when the input mode is switched to the second mode; and
    receiving, by the terminal, a user input of selecting one of the messages included in the message set as the first message input in the second mode.

8. The method of claim 1, further comprising:
    detecting, by the terminal, a user input by a second touch at a location on a touch-sensitive display of the terminal corresponding to a region of the emphasized message in the chatting interface, wherein the predetermined period for the first message to elapse is shortened, in response to a detection of the user input by the second touch.

9. The method of claim 1, further comprising:
receiving a second message input in the second mode by the user or another user having the authority while the first message input in the second mode is emphasized; and
emphasizing, by the terminal, the second message for the predetermined period in the predetermined manner,
wherein the predetermined period for the first message to elapse is shortened in response to the receiving of the second message.

10. The method of claim 1, further comprising:
receiving, by the terminal, a user input with respect to the third UI; and
representing, by the terminal, the feedback using the chatting interface, in response to the user input.

11. The method of claim 10, wherein the displaying of the third UI in the chatting interface comprises displaying the third UI for the predetermined period at a predetermined location in the chatting interface, when the third UI is coupled to the first message input in the second mode.

12. The method of claim 11, wherein the predetermined location includes at least one of:
a location fixed irrespective of the sequential flow of the chatting messages in the message region of the chatting interface; and
a location belonging to a chatting message corresponding to the first message input in the second mode, among the chatting messages.

13. The method of claim 10, wherein the displaying of the third UI in the chatting interface comprises continuously displaying the third UI at a predetermined location in the chatting interface, when the third UI is not coupled to the first message input in the second mode.

14. The method of claim 10, further comprising:
adjusting, by the terminal, the predetermined period based on the user input with respect to the third UI.

15. The method of claim 10, wherein the representing comprises applying an animation effect corresponding to the feedback to a background of the message region in the chatting interface, based on the user input with respect to the third UI.

16. The method of claim 1, wherein the authority comprises:
a first authority assigned to a representative of the chatroom; and
a second authority assigned to at least one participant selected by a possessor of the first authority.

17. The method of claim 1, wherein the chatroom includes a group open chatroom in which anonymous users participate.

18. A method of operating a terminal for an instant messaging service, the method comprising:
displaying, by the terminal, a first user interface (UI) in a chatting interface of a chatroom in which a user of an application is participating, based on whether the user is assigned an authority to emphasize a message in the chatroom, the first UI indicating that a message emphasizing function is provided;
receiving, by the terminal, a message input into an input region of the chatting interface;
transmitting, by the terminal, the input message, in response to a user input using the first UI;
emphasizing, by the terminal, the message transmitted through the first UI for a predetermined period in a predetermined manner; and
cancelling, by the terminal, the emphasizing of the message transmitted through the first UI, when the predetermined time elapses,
wherein the emphasizing in the predetermined manner is i) to display the first message both in a message region of the chatting interface and in a predetermined region different from the message region where based on a sequential flow of chatting messages a location of the first message in the message region changes but a location of the first message in the predetermined region does not change, or ii) to add a visual or audio effect to the first message in the message region, which is not provided to a non-emphasized message,
a second UI for inputting a feedback responding to the message transmitted through the first UI by the user assigned the authority is displayed in a second chatting interface of at least one user not assigned the authority, among users participating in the chatroom, for the predetermined period during which the message transmitted through the first UI is emphasized, and
the displaying of the second UI is cancelled together in the second chatting interface of the at least one user, in response to the cancelling of the emphasizing of the message transmitted through the first UI when the predetermined time elapses.

19. A non-transitory computer-readable storage medium storing instructions that, when executed by a processor, cause the processor to perform the method of claim 1.

* * * * *